(12) United States Patent
Miyashita et al.

(10) Patent No.: US 11,460,757 B2
(45) Date of Patent: Oct. 4, 2022

(54) PROJECTOR AND LIQUID CRYSTAL PANEL MODULE

(71) Applicant: SEIKO EPSON CORPORATION, Tokyo (JP)

(72) Inventors: Tomoaki Miyashita, Suwa-gun Shimosuwa-Machi (JP); Toshizo Nishi, Azumino (JP); Takanori Fukuyama, Matsumoto (JP); Kazunari Sakamoto, Suwa (JP); Suguru Uchiyama, Suwa (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 16/999,218

(22) Filed: Aug. 21, 2020

(65) Prior Publication Data

US 2021/0055640 A1    Feb. 25, 2021

(30) Foreign Application Priority Data

Aug. 23, 2019 (JP) .............................. JP2019-152497

(51) Int. Cl.
   G03B 21/14    (2006.01)
   G03B 21/16    (2006.01)
   (Continued)

(52) U.S. Cl.
   CPC ......... G03B 21/145 (2013.01); G02F 1/1333 (2013.01); G03B 21/16 (2013.01); H04N 9/3144 (2013.01); G02B 1/11 (2013.01); G03B 21/005 (2013.01); G03B 21/2073 (2013.01); H04N 9/3167 (2013.01)

(58) Field of Classification Search
   CPC ................ G03B 21/145; G03B 21/005; G03B 21/2073; G03B 21/16; H04N 9/3167; H04N 9/3144; G02F 1/1333; G02B 1/11
   See application file for complete search history.

(56) References Cited

U.S. PATENT DOCUMENTS

2005/0162760 A1*    7/2005    Fujimori .............. H04N 9/3144
                                                                        359/820
2005/0168703 A1*    8/2005    Fujimori .............. H04N 9/3144
                                                                        353/52

(Continued)

FOREIGN PATENT DOCUMENTS

| JP | 2000-193943 A | 7/2000 |
| JP | 2011-197390 A | 10/2011 |
| JP | 2018-010181 A | 1/2018 |

*Primary Examiner* — Bao-Luan Q Le
(74) *Attorney, Agent, or Firm* — Dority & Manning, P.A.

(57) ABSTRACT

A projector according to the present disclosure includes a light source device, a plurality of light modulation devices, a combining prism, a support member, and a projection optical system. A first light modulation device includes a first light modulation panel having a first incident side substrate, a first exit side substrate, and a liquid crystal layer, a frame body which has a first opening part, and surrounds a side surface of the first incident side substrate and a side surface of the first exit side substrate, a second incident side substrate opposed to the first incident side substrate in the first opening part, an incident side member fixed to the second incident side substrate and the frame body, a support target member supported by the support member, and a holding member which is made elastically deformable.

11 Claims, 9 Drawing Sheets

(51) Int. Cl.
*G02F 1/1333* (2006.01)
*H04N 9/31* (2006.01)
G03B 21/00 (2006.01)
G02B 1/11 (2015.01)
G03B 21/20 (2006.01)

(56) References Cited

U.S. PATENT DOCUMENTS

| | | | |
|---|---|---|---|
| 2005/0185146 A1* | 8/2005 | Fujimori | G03B 21/16 353/61 |
| 2005/0185244 A1* | 8/2005 | Fujimori | H04N 9/3144 359/237 |
| 2005/0195460 A1* | 9/2005 | Fujimori | G02F 1/133385 359/237 |
| 2005/0200813 A1* | 9/2005 | Kitabayashi | H04N 9/3144 353/20 |
| 2006/0092382 A1* | 5/2006 | Kinoshita | G03B 21/16 353/54 |
| 2007/0206158 A1* | 9/2007 | Kinoshita | G03B 21/18 353/52 |
| 2009/0153753 A1* | 6/2009 | Yanai | H04N 9/3167 349/5 |
| 2010/0091213 A1* | 4/2010 | Miyashita | G03B 21/16 349/58 |
| 2010/0165220 A1* | 7/2010 | Endo | H04N 9/3105 349/8 |
| 2018/0017857 A1 | 1/2018 | Nagumo | |

* cited by examiner

PROJECTOR AND LIQUID CRYSTAL PANEL MODULE

The present application is based on, and claims priority from JP Application Serial Number 2019-152497, filed Aug. 23, 2019, the disclosure of which is hereby incorporated by reference herein in its entirety.

BACKGROUND

1. Technical Field

The present disclosure relates to a projector.

2. Related Art

In the past, there has been known a projector provided with a light source device, a light modulation device for modulating light emitted from the light source device, and a projection optical device for projecting the light modulated by the light modulation device. In JP-A-2011-197390 (Document 1), there is disclosed a panel holder which is a panel holder for holding a liquid crystal panel in the light modulation device using for the projector, and is provided with a panel support frame for housing the liquid crystal panel and a holding plate for pressing the liquid crystal panel. Further, in Document 1, there is described the fact that incident side dust-proof glass is attached to an external surface of an opposed substrate.

As described in Document 1, in the liquid crystal panel, a configuration of preventing dust on a surface of the liquid crystal panel by covering a pair of substrates opposed to each other across a liquid crystal layer with dust-proof glass is adopted in some cases. In that case, when the incident side substrate and the dust-proof glass are fixed to each other with a bonding layer, the bonding layer is deteriorated by light, and there is a possibility that the image quality degrades.

SUMMARY

A projector according to an aspect of the present disclosure includes a light source device, a plurality of light modulation devices configured to modulate light emitted from the light source device, a combining prism configured to combine light emitted from the plurality of light modulation devices, a support member configured to support the plurality of light modulation devices to the combining prism, and a projection optical system configured to project light emitted from the combining prism, wherein a first light modulation device out of the plurality of light modulation devices includes a first light modulation panel having a first incident side substrate, a first exit side substrate, and a liquid crystal layer disposed between the first incident side substrate and the first exit side substrate, a frame body which has a first opening part, and is disposed so as to surround at least a side surface of the first incident side substrate and a side surface of the first exit side substrate, a second incident side substrate disposed in the first opening part so as to be opposed to the first incident side substrate, an incident side member fixed to the second incident side substrate and the frame body, a support target member supported by the support member, and a holding member which is made elastically deformable, the holding member presses and holds the incident side member, the second incident side substrate, the first incident side substrate, the first exit side substrate, and the support target member in a clipped state due to an elastic deformation of the holding member, the first light modulation panel has contact with the support target member, and no adhesive layer is disposed between the second incident side substrate and the first incident side substrate.

In the projector according to the above aspect of the present disclosure, the first light modulation device may further include a second exit side substrate disposed so as to be opposed to the first exit side substrate.

In the projector according to the above aspect of the present disclosure, the first light modulation device may modulate blue light.

In the projector according to the above aspect of the present disclosure, the support target member may have a first locking part to be locked by the holding member, and the holding member may include a pressing part configured to press the incident side member, and a second locking part which is disposed in a circumferential edge portion of the pressing part, and has a second opening part in which the first locking part is inserted.

In the projector according to the above aspect of the present disclosure, the first light modulation device may further include an exit side polarization plate disposed so as to be opposed to the first exit side substrate, and the exit side polarization plate may be held by the support target member.

In the projector according to the above aspect of the present disclosure, the first light modulation device may further include an antireflection layer disposed on a surface opposed to the first incident side substrate of the second incident side substrate, and a surface opposed to the second incident side substrate of the first incident side substrate.

In the projector according to the above aspect of the present disclosure, the first light modulation device may further include a first fixation member disposed between the frame body and a side surface of the first incident side substrate, and between the frame body and a side surface of the first exit side substrate.

In the projector according to the above aspect of the present disclosure, the first light modulation device may further include a second fixation member disposed between a circumferential edge portion of the second incident side substrate and the incident side member, and between the frame body and the incident side member.

DESCRIPTION OF EXEMPLARY EMBODIMENTS

First Embodiment

A first embodiment of the present disclosure will hereinafter be described using FIG. 1 through FIG. 8.

It should be noted that in each of the drawings described below, the constituents are shown with the scale ratios of respective sizes set differently between the constituents in some cases in order to facilitate the visualization of each of the constituents.

An example of a projector according to the present embodiment will be described.

The projector according to the present embodiment is a projection-type image display device for displaying a color picture on a screen (a projection target surface). The projector is provided with three light modulation devices corresponding respectively to colored light beams, namely red light, green light, and blue light. Further, the projector is provided with semiconductor lasers capable of obtaining high-intensity and high-power light as light sources of an illumination device.

Figure 1:
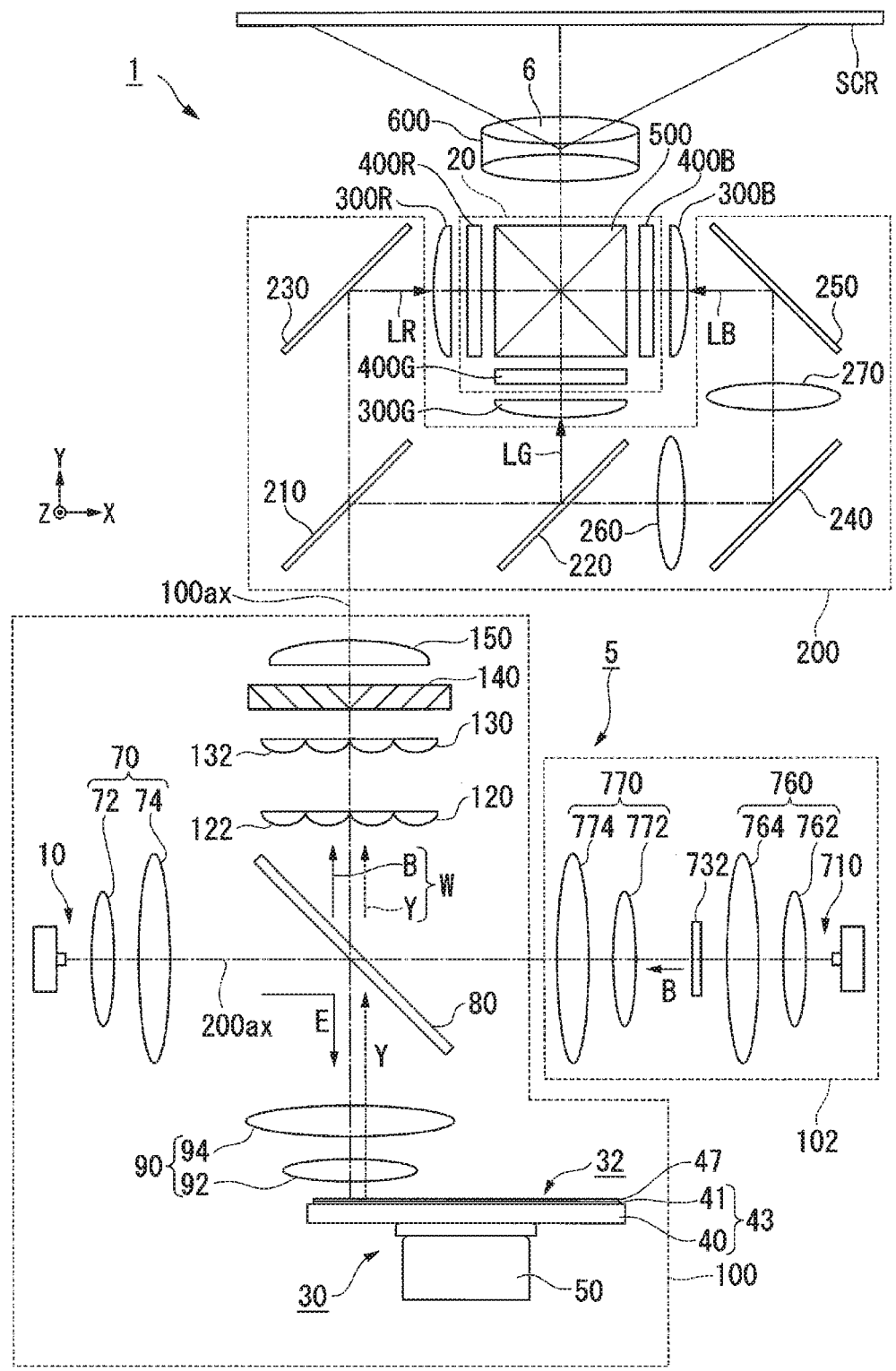
FIG. 1 is a schematic configuration diagram of a projector according to a first embodiment.

FIG. 1 is a schematic configuration diagram showing an optical system of the projector 1 according to the present embodiment.

As shown in FIG. 1, the projector 1 is provided with a light source device 5, a color separation light guide optical system 200, an image generation module 20 having a red-light liquid crystal panel module 400R, a green-light liquid crystal panel module 400G, and a blue-light liquid crystal panel module 400B (a first light modulation device), a combining prism 500, and a projection optical device 600.

The light source device 5 has a first illumination device 100 and a second illumination device 102.

The first illumination device 100 is provided with a first light source 10, a collimating optical system 70, a dichroic mirror 80, a collimating light collection optical system 90, a wavelength conversion device 30, a first lens array 120, a second lens array 130, a polarization conversion element 140, and a superimposing lens 150.

The first light source 10 is formed of a semiconductor laser for emitting excitation light E as blue light which has a peak wavelength, namely a peak of the emission intensity at a wavelength of, for example, 445 nm, and has a wavelength range in a first wavelength band of, for example, 440 through 450 nm. It is possible for the first light source 10 to be formed of a single semiconductor laser, or to be formed of a plurality of semiconductor lasers. The first light source 10 is disposed so that the light axis 200ax of the laser beam emitted from the first light source 10 is perpendicular to an illumination light axis 100ax. It should be noted that as the first light source 10, it is also possible to use a semiconductor laser for emitting the excitation light having a peak wavelength other than 445 nm, for example, a peak wavelength of 460 nm. The illumination light axis 100ax is defined as a central axis of white light W emitted from the light source device 5.

The collimating optical system 70 is provided with a first lens 72 and a second lens 74. The collimating optical system 70 substantially collimates the light emitted from the first light source 10. The first lens 72 and the second lens 74 are each formed of a convex lens.

The dichroic mirror 80 is disposed in a light path from the collimating optical system 70 to the collimating light collection optical system 90 in a posture of crossing each of the light axis 200ax of the first light source 10 and the illumination light axis 100ax at an angle of 45°. The dichroic mirror 80 reflects the excitation light E, and transmits fluorescence Y as yellow light including a red light component and a green light component.

The collimating light collection optical system 90 has a function of making the excitation light E having been transmitted through the dichroic mirror 80 converge to enter the wavelength conversion layer 47 of the wavelength conversion device 30, and a function of substantially collimating the fluorescence Y emitted from the wavelength conversion device 30. The collimating light collection optical system 90 is provided with a first lens 92 and a second lens 94. The first lens 92 and the second lens 94 are each formed of a convex lens.

The second illumination device 102 is provided with a second light source device 710, a light collection optical system 760, a diffuser plate 732, and a collimating optical system 770.

The second light source 710 is formed of the same semiconductor laser as the first light source 10 of the first illumination device 100. It is possible for the second light source 710 to be formed of a single semiconductor laser, or to be formed of a plurality of semiconductor lasers. Further, it is also possible for the second light source 710 to be formed of a semiconductor laser different in wavelength band from the semiconductor laser of the first light source 10.

The light collection optical system 760 is provided with a first lens 762 and a second lens 764. The blue light LB emitted from the second light source 710 is converged by the light collection optical system 760 on a diffusion surface of the diffuser plate 732 or in the vicinity of the diffuser plate 732. The first lens 762 and the second lens 764 are each formed of a convex lens.

The diffuser plate 732 diffuses the blue light LB from the second light source 710 to thereby generate the blue light LB having a light distribution similar to the light distribution of the fluorescence Y having been emitted from the wavelength conversion device 30. As the diffuser plate 732, there can be used, for example, obscured glass made of optical glass.

The collimating optical system 770 is provided with a first lens 772 and a second lens 774. The collimating optical system 770 substantially collimates the light emitted from the diffuser plate 732. The first lens 772 and the second lens 774 are each formed of a convex lens.

The blue light LB having been emitted from the second illumination device 102 is reflected by the dichroic mirror 80, and is then combined with the fluorescence Y having been emitted from the wavelength conversion device 30 and then transmitted through the dichroic mirror 80 to thereby turn to the white light W. The white light W enters the first lens array 120.

The wavelength conversion device 30 is provided with a wavelength conversion element 32 and a motor 50. The wavelength conversion element 32 is made rotatable around a rotational axis by the motor 50. The wavelength conversion element 32 has a base member 43 and a wavelength conversion layer 47. The wavelength conversion element 32 emits the fluorescence Y toward the same side as the side which the excitation light E enters. In other words, the wavelength conversion element 32 is a reflective-type wavelength conversion element.

The base member 43 has a base member main body 40 and a reflecting layer 41. The base member main body 40 is formed of a material including metal high in thermal conductivity such as aluminum or copper. The reflecting layer 41 is disposed on one surface of the base member main body 40. The reflecting layer 41 reflects the fluorescence Y emitted from the wavelength conversion layer 47 and the excitation light E. The reflecting layer 41 is formed of metal high in reflectance such as silver.

The wavelength conversion layer 47 includes a ceramic phosphor for performing the wavelength conversion on the excitation light E into the fluorescence Y in the different wavelength band from the wavelength band of the excitation light E. As an example, the wavelength conversion layer 47 includes, for example, an yttrium aluminum garnet (YAG) type phosphor containing cerium (Ce) as an activator agent. The wavelength band of the fluorescence Y is, for example, 490 through 750 nm, and the fluorescence Y is the yellow light including the red light component and the green light component. It should be noted that it is also possible for the wavelength conversion layer 47 to include a single-crystal phosphor.

The first lens array 120 is provided with a plurality of first lenses 122 for dividing the light from the dichroic mirror 80 into a plurality of partial light beams. The plurality of first lenses 122 is arranged in a matrix in a plane perpendicular to the illumination light axis 100ax.

The second lens array 130 has a plurality of second lenses 132 corresponding respectively to the plurality of first lenses 122 of the first lens array 120. The second lens array 130 forms the image of each of the first lenses 122 constituting the first lens array 120 in the vicinity of the image forming area of each of the red-light liquid crystal panel module 400R, the green-light liquid crystal panel module 400G, and the blue-light liquid crystal panel module 400B in cooperation with the superimposing lens 150 located in the posterior stage. The plurality of second lenses 132 is arranged in a matrix in a plane perpendicular to the illumination light axis 100ax.

The partial light beams divided into by the first lens array 120 are converted by the polarization conversion element 140 into linearly-polarized light beams uniformed in the polarization direction with each other.

The superimposing lens 150 converges the partial light beams emitted from the polarization conversion element 140, and superimposes the result on each other in the vicinity of the image forming area of each of the red-light liquid crystal panel module 400R, the green-light liquid crystal panel module 400G, and the blue-light liquid crystal panel module 400B. The first lens array 120, the second lens array 130, and the superimposing lens 150 constitute an integrator optical system for homogenizing the in-plane light intensity distribution of the light from the wavelength conversion device 30.

The color separation light guide optical system 200 is provided with a dichroic mirror 210, a dichroic mirror 220, a reflecting mirror 230, a reflecting mirror 240, a reflecting mirror 250, a relay lens 260, and a relay lens 270. The color separation light guide optical system 200 separates the white light W obtained from the first illumination device 100 and the second illumination device 102 into the red light LR, the green light LG, and the blue light LB, and then guides the red light LR, the green light LG, and the blue light LB respectively to the red-light liquid crystal panel module 400R, the green-light liquid crystal panel module 400G, and the blue-light liquid crystal panel module 400B corresponding thereto.

A field lens 300R is disposed between the color separation light guide optical system 200 and the red-light liquid crystal panel module 400R. A field lens 300G is disposed between the color separation light guide optical system 200 and the green-light liquid crystal panel module 400G. A field lens 300B is disposed between the color separation light guide optical system 200 and the blue-light liquid crystal panel module 400B.

The dichroic mirror 210 transmits the red light component, and reflects the green light component and the blue light component. The dichroic mirror 220 reflects the green light component, and transmits the blue light component. The reflecting mirror 230 reflects the red light component. The reflecting mirror 240 and the reflecting mirror 250 reflect the blue light component.

The red light having been transmitted through the dichroic mirror 210 is reflected by the reflecting mirror 230, and is then transmitted through the field lens 300R to enter the image forming area of the red-light liquid crystal panel module 400R. The green light having been reflected by the dichroic mirror 210 is further reflected by the dichroic mirror 220, then transmitted through the field lens 300G, and then enters the image forming area of the green-light liquid crystal panel module 400G. The blue light having been transmitted through the dichroic mirror 220 enters the image forming area of the blue-light liquid crystal panel module 400B via the relay lens 260, the reflecting mirror 240 on the incident side, the relay lens 270, the reflecting mirror 250 on the exit side, and the field lens 300B.

The red-light liquid crystal panel module 400R, the green-light liquid crystal panel module 400G, and the blue-light liquid crystal panel module 400B each modulate the colored light having entered the liquid crystal panel modules in accordance with the image information to thereby form the image light.

The combining prism 500 combines the image light emitted from the red-light liquid crystal panel module 400R, the image light emitted from the green-light liquid crystal panel module 400G, and the image light emitted from the blue-light liquid crystal panel module 400B with each other to form full-color image light. The combining prism 500 is formed of a cross dichroic prism shaped like a rectangular solid having a configuration in which four rectangular prisms bonded to each other. In the combining prism 500, on the boundary surfaces having a substantially X shape on which the rectangular prisms are bonded to each other, there are formed dichroic mirrors each formed of a dielectric multilayer film.

The image light having been emitted from the combining prism 500 is projected by the projection optical system 600 in an enlarged manner to form an image on the screen SCR. In other words, the projection optical device 600 projects the light modulated by the red-light liquid crystal panel module 400R, the light modulated by the green-light liquid crystal panel module 400G, and the light modulated by the blue-light liquid crystal panel module 400B. The projection optical device 600 is formed of a plurality of projection lenses 6.

Image Generation Module

Figure 2:
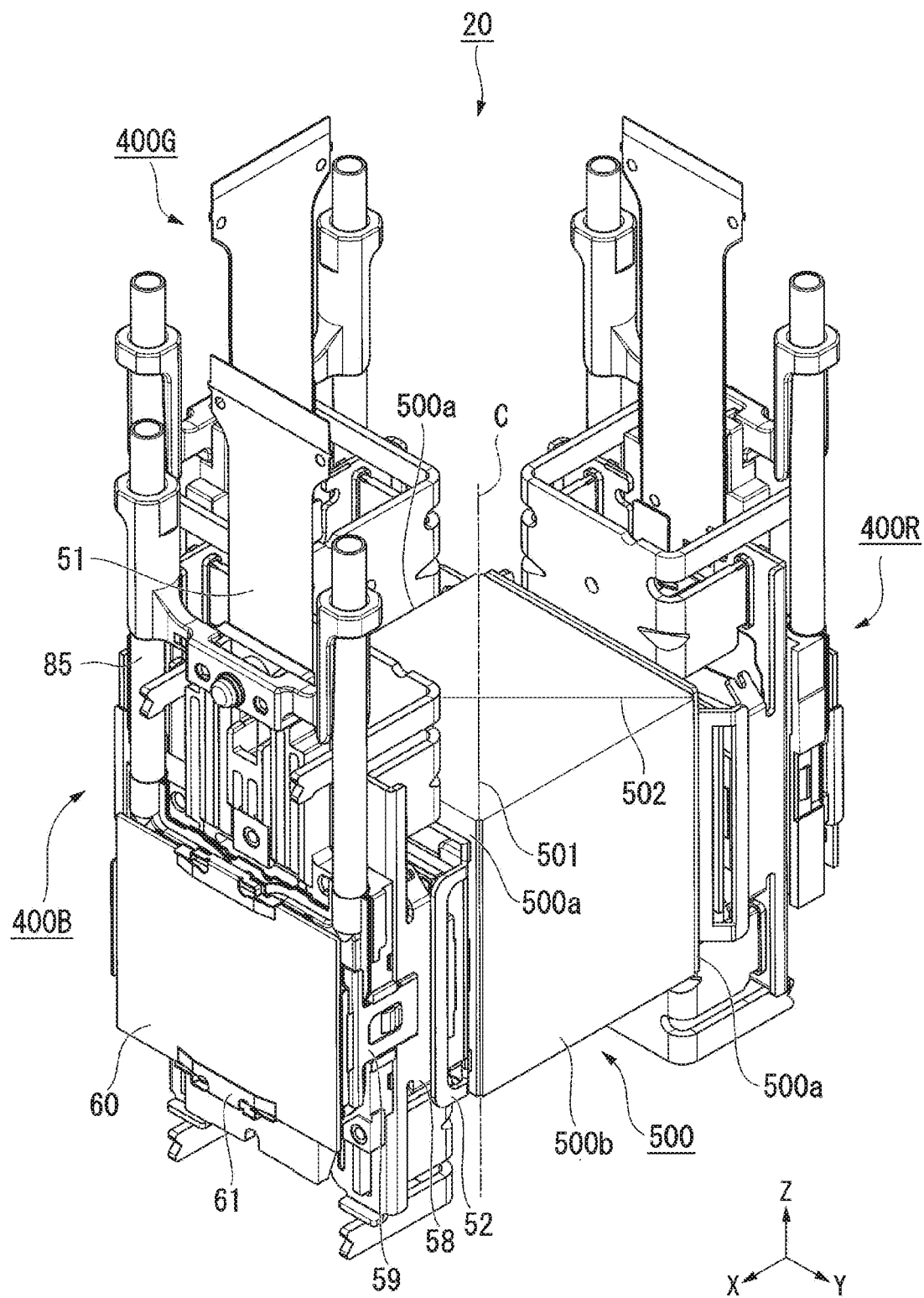
FIG. 2 is a perspective view of an image generation module.

FIG. 2 is a perspective view of the image generation module 20.

As shown in FIG. 2, the image generation module 20 is provided with the blue-light liquid crystal panel module (the first light modulation device) 400B, the green-light liquid crystal panel module 400G, the red-light liquid crystal panel module 400R, and the combining prism 500. Hereinafter, in the combining prism 500, an imaginary axis passing through the center of a crossing part between the two cross dichroic mirrors 501, 502 is defined as a central axis C of the combining prism 500.

The blue-light liquid crystal panel module 400B, the green-light liquid crystal panel module 400G, and the red-light liquid crystal panel module 400R are disposed so as to respectively opposed to three surfaces out of the four surfaces parallel to the central axis C of the combining prism 500. Therefore, in the combining prism 500, the three surfaces parallel to the central axis C are planes of incidence 500a which the image light emitted from the respective liquid crystal panel modules 400B, 400G, and 400R enters. The remaining one surface out of the four surfaces parallel to the central axis C of the combining prism 500 is an exit surface 500b from which the image light combined by the combining prism 500 is emitted.

In the following description, an axis parallel to the central axis C of the combining prism 500 is defined as a Z axis, an axis parallel to a direction in which the blue-light liquid crystal panel module 400B and the red-light liquid crystal panel module 400R are opposed to each other in a plane perpendicular to the Z axis is defined as an X axis, and an axis perpendicular to the X axis and the Z axis is defined as a Y axis. Further, for the sake of convenience of explanation, the side on which the light enters each of the liquid crystal panel modules 400B, 400G, and 400R is referred to an incident side, and the side on which the light is emitted from each of the liquid crystal panel modules 400B, 400G, and 400R is referred to as an exit side.

On the planes of incidence 500a of the combining prism 500, there are fixed support members 52 for supporting the liquid crystal panel modules 400B, 400G, and 400R, respectively. The blue-light liquid crystal panel module 400B is supported by the support member 52 in a state of being opposed to the plane of incidence 500a of the combining prism 500. Similarly, the green-light liquid crystal panel module 400G is supported by the support member 52 in a state of being opposed to the plane of incidence 500a of the combining prism 500. The red-light liquid crystal panel module 400R is supported by the support member 52 in a state of being opposed to the plane of incidence 500a of the combining prism 500.

In the image generation module 20 in the present embodiment, the configuration of the first light modulation device related to the present disclosure is adopted in the blue-light liquid crystal panel module 400B out of the three liquid crystal panel modules 400B, 400G, and 400R. In other words, the first light modulation device related to the present disclosure modulates the blue light. The configuration of the first light modulation device related to the present disclosure is not adopted in the green-light liquid crystal panel module 400G and the red-light liquid crystal panel module 400R. It should be noted that the configuration of the first light modulation device related to the present disclosure can also be adopted in the green-light liquid crystal panel module 400G and the red-light liquid crystal panel module 400R.

Blue-Light Liquid Crystal Panel Module

The blue-light liquid crystal panel module 400B will hereinafter be described.

Figure 3:
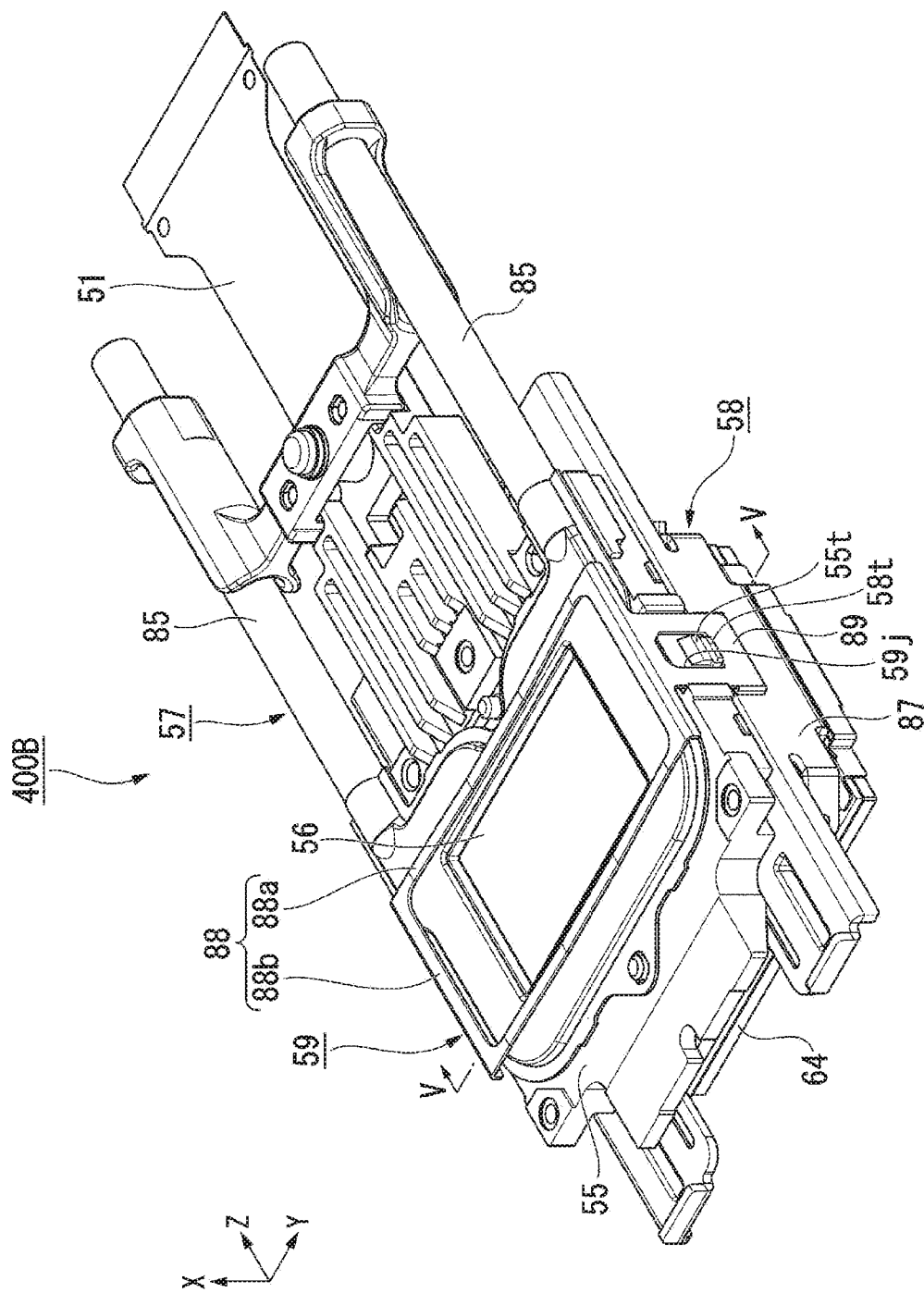
FIG. 3 is a perspective view of a blue-light liquid crystal panel module.
Figure 4:
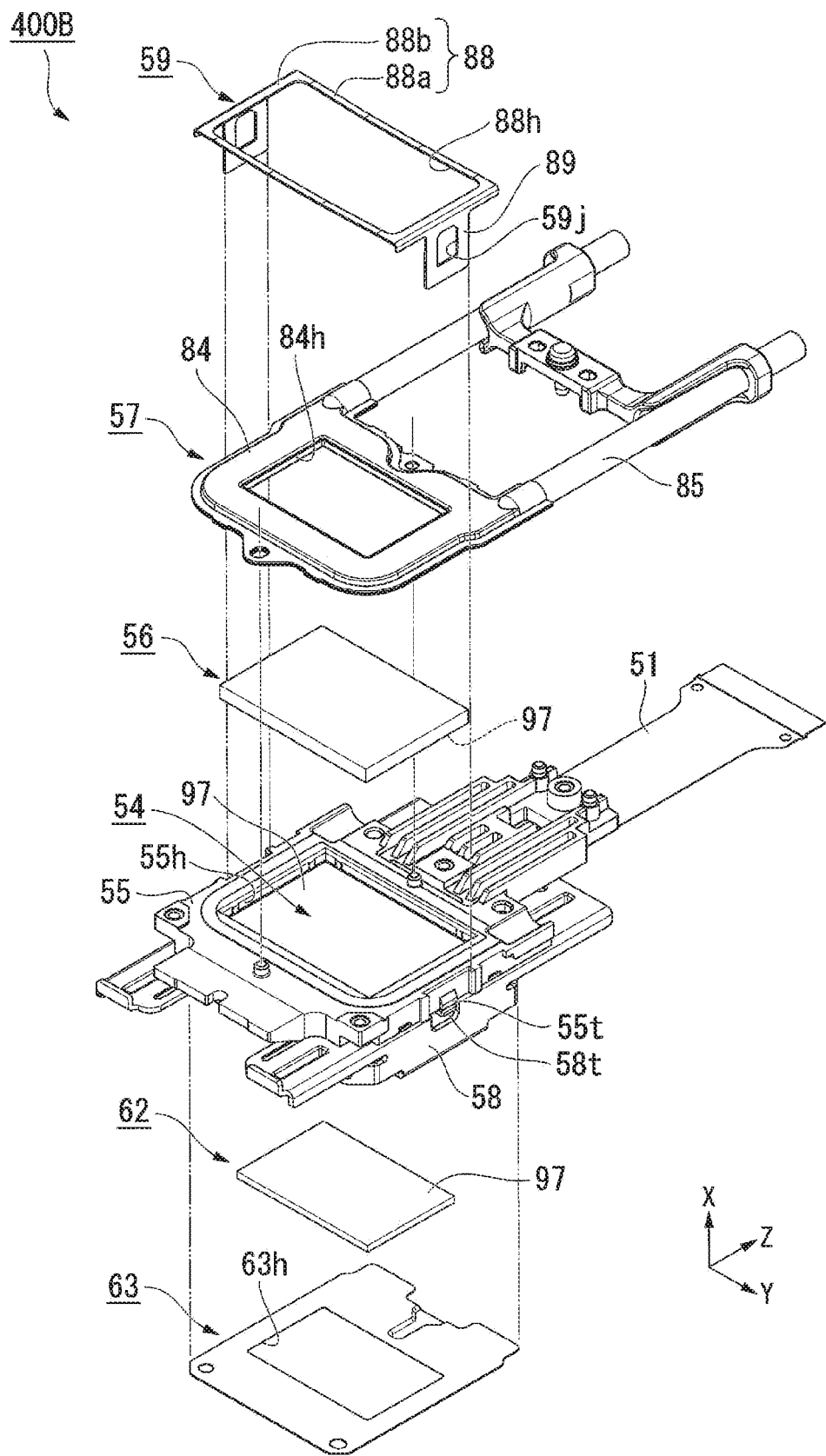
FIG. 4 is an exploded perspective view of the blue-light liquid crystal panel module.
Figure 5:
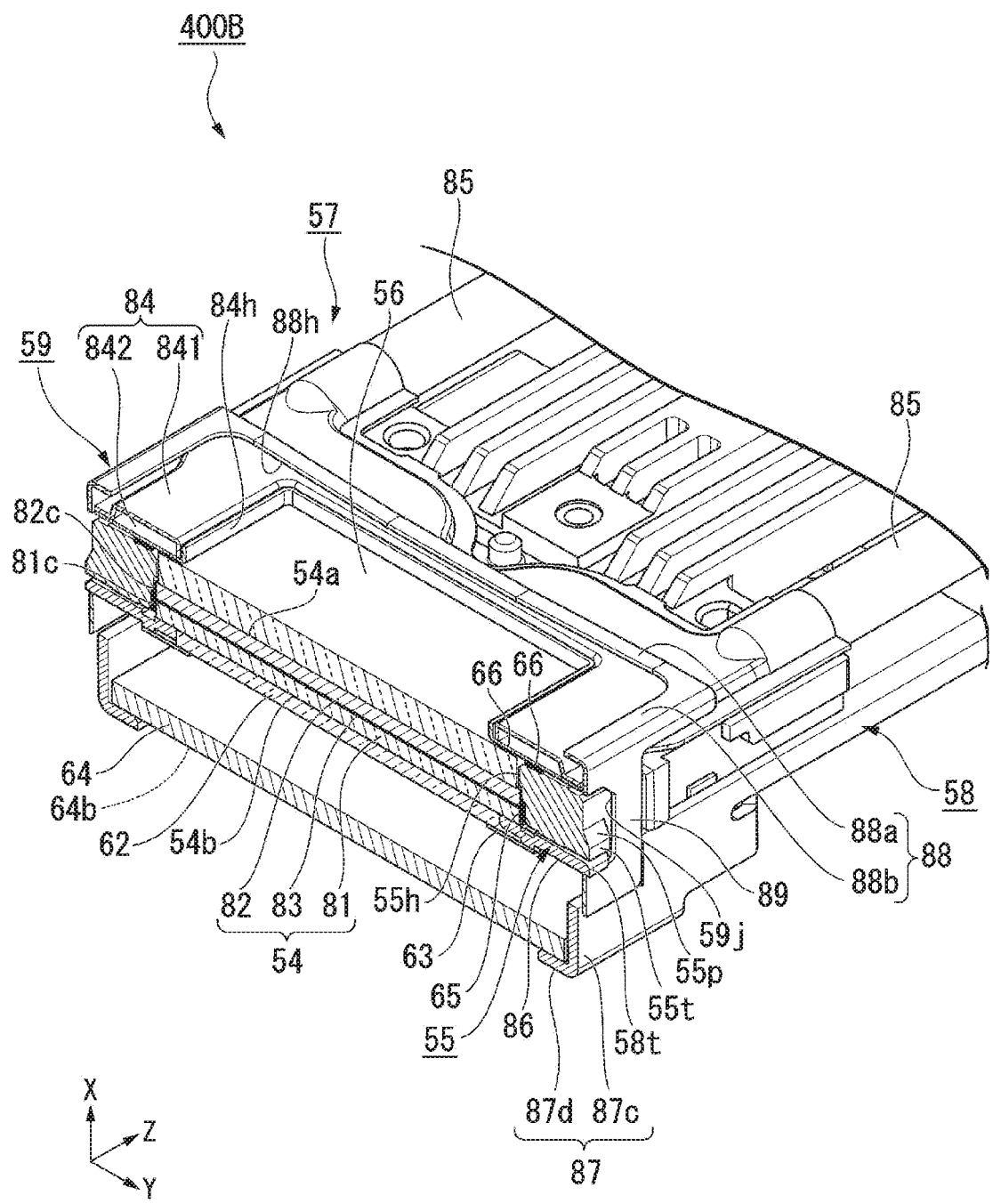
FIG. 5 is a cross-sectional view of the blue-light liquid crystal panel module along the line V-V in FIG. 3.

FIG. 3 is a perspective view of the blue-light liquid crystal panel module 400B. FIG. 4 is an exploded perspective view of the blue-light liquid crystal panel module 400B. FIG. 5 is a cross-sectional view of the blue-light liquid crystal panel module 400B along the line V-V in FIG. 3. It should be noted that in FIG. 3 through FIG. 5, illustration of the incident side polarization plate and the support member for supporting the incident side polarization plate will be omitted.

As shown in FIG. 3 through FIG. 5, the blue-light liquid crystal panel module 400B is provided with a liquid crystal panel 54 (a first light modulation panel), a frame body 55, incident side dust-proof glass 56 (a second incident side substrate), an incident side member 57, a frame 58 (a support target member), a holding member 59, an incident side polarization plate 60 (see FIG. 2), an incident side polarization plane support member 61 (see FIG. 2), exit side dust-proof glass 62 (a second exit side substrate), an exit side dust-proof glass support plate 63, an exit side polarization plate 64, a first fixation member 65, and a second fixation member 66.

As shown in FIG. 5, the liquid crystal panel 54 has an element substrate 81 (a first exit side substrate), an opposed substrate 82 (a first incident side substrate), and a liquid crystal layer 83 disposed between the element substrate 81 and the opposed substrate 82. The element substrate 81 is constituted by a TFT array substrate having a plurality of thin-film transistors (TFT) arranged in an array. The opposed substrate 82 is constituted by a microlens array substrate having a plurality of microlenses arranged in an array.

The liquid crystal panel 54 has a plane of incidence 54a which the light enters, and an exit surface 54b from which the light is emitted. The plane of incidence 54a of the liquid crystal panel 54 is a surface different from a surface on a side opposed to the element substrate 81 out of the two surfaces of the opposed substrate 82. The exit surface 54b of the liquid crystal panel 54 is a surface different from a surface on a side opposed to the opposed substrate 82 out of the two surfaces of the element substrate 81. As shown in FIG. 4, to the liquid crystal panel 54, there is coupled a flexible printed-wiring board 51 for supplying the liquid crystal panel 54 with a variety of signals such as an image signal.

The frame body 55 has a rectangular ring-like shape viewed from a direction parallel to the X axis, and has a first opening part 55h in which the liquid crystal panel 54 is housed. The frame body 55 is disposed so as to surround at least a side surface 82c of the opposed substrate 82 and a side surface 81c of the element substrate 81. Further, in the outer circumferential surfaces of the frame body 55, at positions corresponding to second opening parts 59j of the holding member 59 described later, there are disposed insertion protruding parts 55t. The insertion protruding parts 55t each protrude from the outer circumferential surface of the frame body 55 toward the outside, and are each inserted in the second opening part 59j together with a locking protruding part 58t of a frame 58 described later. On the incident side of the insertion protruding part 55t, there is disposed a taper surface 55p tilted in a direction of flaring outward in a direction from the incident side toward the exit side.

The frame body 55 is fixed to the liquid crystal panel 54. Specifically, the frame part 55 is fixed to the liquid crystal panel 54 with the first fixation member 65 disposed between the frame body 55 and the side surface 82c of the opposed substrate 82, and between the frame body 55 and the side surface 81c of the element substrate 81. Specifically, the blue-light liquid crystal panel module 400B has the first fixation member 65 disposed between the frame body 55 and the side surface 82c of the opposed substrate 82, and between the frame body 55 and the side surface 81c of the element substrate 81. The constituent member of the first fixation member 65 is not particularly limited providing the constituent member is capable of fixing the frame body 55 and the opposed substrate 82 to each other and fixing the frame body 55 and the element substrate 81 to each other, but there is used, for example, an adhesive.

The incident side dust-proof glass 56 is disposed so as to be opposed to the opposed substrate 82 in the first opening part 55h of the frame body 55. The incident side dust-proof glass 56 is a plate material for preventing the dust from adhering to the opposed substrate 82. The incident side dust-proof glass 56 is formed of a transparent member excellent in scratch resistance property and heat resistance property such as sapphire.

As shown in FIG. 4, the incident side member 57 has a support frame 84 for supporting the incident side dust-proof glass 56 and two liquid flow pipes 85.

The support frame 84 has a rectangular ring-like shape viewed from a direction parallel to the X axis, and has an opening part 84h which allows the light to enter. As shown in FIG. 5, the support frame 84 has an incident side support frame 841 and an exit side support frame 842, and the incident side support frame 841 and the exit side support frame 842 are combined with each other to constitute a hollow frame body.

The liquid flow pipes 85 circulate a cooling liquid such as water or ethylene glycol for cooling the liquid crystal panel 54 inside via the support frame 84. In other words, the blue-light liquid crystal panel module 400B in the present embodiment has a liquid-cooled liquid crystal panel cooling mechanism. One ends of the liquid flow pipes 85 are coupled to the support frame 84, and the other ends of the liquid flow pipes 85 are coupled to a tank (not shown) where the cooling liquid is retained. One of the liquid flow pipes 85 makes the cooling liquid inflow from the tank to the support frame 84. The other of the liquid flow pipes 85 makes the cooling liquid outflow from the support frame 84 to the tank.

The incident side member 57 is fixed to the incident side dust-proof glass 56 and the frame body 55. Specifically, the incident side member 57 is fixed to the incident side dust-proof glass 56 with the second fixation member 66 disposed between the incident side member 57 and a circumferential edge portion of the incident side dust-proof glass 56, and is fixed to the frame body 55 with the second fixation member 66 disposed between the incident side member 57 and the frame body 55. In other words, the blue-light liquid crystal panel module 400B has the second fixation member 66 disposed between the circumferential edge portion of the incident side dust-proof glass 56 and the incident side member 57 and between the frame body 55 and the incident side member 57. The constituent member of the second fixation member 66 is not particularly limited providing the constituent member is capable of fixing the incident side dust-proof glass 56 and the incident side member 57 to each other and fixing the frame body 55 and the incident side member 57 to each other, but there is used, for example, an adhesive.

The exit side dust-proof glass 62 is disposed so as to be opposed to the element substrate 81. The exit side dust-proof glass 62 is a plate material for preventing the dust from adhering to the element substrate 81 of the liquid crystal panel 54. The exit side dust-proof glass 62 is formed of a transparent member such as neoceram.

As shown in FIG. 2, the frame 58 is supported by the support member 52 fixed to the combining prism 500. As shown in FIG. 5, the frame 58 has a panel support plate 86, polarization plate support frames 87 respectively extending from both end parts in the Y-axis direction of the panel support plate 86 toward the exit side, and the locking protruding parts 58t. The panel support plate 86, the polarization plate support frames 87, and the locking protruding parts 58t are formed as an integrated member.

The panel support plate 86 supports the liquid crystal panel 54 from the exit side in a state of having contact with a circumferential edge portion of the exit surface 54b of the liquid crystal panel 54, namely the circumferential edge portion of the element substrate 81. The polarization plate support frame 87 has a sidewall part 87c, and a bottom wall part 87d bent substantially vertically from the sidewall part 87c. The polarization plate support frame 87 supports the exit side polarization plate 64 from the exit side in a state in which the bottom wall part 87d has contact with an edge portion of the exit surface 64b of the exit side polarization plate 64.

In the outer edge portion of the panel support plate 86, at positions corresponding to the second opening parts 59j of the holding member 59 described later, there are disposed the locking protruding parts 58t (first locking parts). The locking protruding parts 58t are formed integrally with the outer edge portion of the panel support plate 86, and protrude respectively from the sidewall parts 87c of the polarization plate support frame 87 toward the outside in the Y-axis direction. The locking protruding part 58t is inserted in the second opening part 59j together with the insertion protruding part 55t of the frame body 55, and has contact with the edge on the exit side of the second opening part 59j.

As shown in FIG. 4, the holding member 59 has a pressing part 88, and second clocking parts 89 disposed in a circumferential edge portion of the pressing part 88. In the present embodiment, the second locking parts 89 are respectively disposed at both ends in the Y-axis direction in the circumferential edge portion of the pressing part 88.

The pressing part 88 has a rectangular ring-like shape viewed from a direction parallel to the X axis, and has a third opening part 88h for allowing the light emitted from the light source device 5 to pass. Hereinafter, among the portions corresponding to four sides of the pressing part 88, the portions extending in parallel to a long-side direction (the Y-axis direction) of the liquid crystal panel 54 are each referred to as a long-side part 88a, and the portions extending in parallel to a short-side direction (the Z-axis direction) of the liquid crystal panel 54 are each referred to as a short-side part 88b.

In the present embodiment, in the pressing part 88, the long-side parts 88a each warp so that a central portion is convexed toward the exit side with respect to both end portions coupled to the short-side parts 88b. As shown in FIG. 5, the pressing part 88 has contact with the support frame 84 of the incident side member 57 in the central portion of the long-side part 88a, and does not have contact with the support frame 84 of the incident side member 57 in the both end portions of the long-side part 88a and the short-side parts 88b.

The holding member 59 is made elastically deformable. In other words, the holding member 59 is formed of an elastically deformable member. It should be noted that the holding member 59 is not necessarily required to be elastically deformable in its entirety, but is only required to be elastically deformable in at least the long-side parts 88a. Thus, the long-side parts 88a exert a plate spring action.

The second locking parts 89 extend from the short-side parts 88b of the pressing part 88 toward the exit side. The second locking parts 89 each have a rectangular ring-like shape viewed from the Y-axis direction, and each have the second opening part 59j to which the insertion protruding part 55t of the frame body 55 and the locking protruding part 58t of the frame 58 are inserted.

In the state in which no force is applied to the holding member 59, even when making the central portion of the long-side part 88*a* have contact with the support frame 84, a lower side of the second opening part 59*j* is located at a position higher than the locking protruding part 58*t*, and thus, the locking protruding part 58*t* is not inserted in the second opening part 59*j*. In an assembling process of the blue-light liquid crystal panel module 400B, when applying a force in a direction of pushing down the short-side parts 88*b* to elastically deform the long-side parts 88*a* in the warped state after making the central portions of the respective long-side parts 88*a* have contact with the support frame 84, the positions of the second opening parts 59*j* move downward, and thus, the locking protruding parts 58*t* are inserted in the second opening parts 59*j* together with the insertion protruding parts 55*t*, respectively.

As described above, in the state in which the locking protruding parts 58*t* are locked by the second opening parts 59*j*, the holding member 59 presses the support frame 84 against the incident side dust-proof glass 56 due to the plate spring action of the long-side parts 88*a*. As described above, the holding member 59 presses and holds the incident side member 57, the incident side dust-proof glass 56, the opposed substrate 82, the element substrate 81, and the frame 58 in a clipped state due to the elastic deformation of the holding member 59.

In the case of the present embodiment, since the taper surface 55*p* is provided to each of the insertion protruding parts 55*t* of the frame body 55, when pushing down the short-side parts 88*b* of the holding member 59 in the assembling process of the blue-light liquid crystal panel module 440B, the lower end of each of the second locking parts 89 moves while sliding on the taper surface 55*p*, and then the locking protruding parts 58*t* and the insertion protruding parts 55*t* are inserted in the second opening parts 59*j*, respectively. Thus, it is possible to smoothly perform an attachment operation of the holding member 59.

The opposed substrate 82 of the liquid crystal panel 54 and the incident side dust-proof glass 56 are pressed by the holding member 59 to thereby adhere to each other. No adhesive is disposed between the opposed substrate 82 and the incident side dust-proof glass 56. It should be noted that in the green-light liquid crystal panel module 400G and the red-light liquid crystal panel module 400R, it is possible to dispose an adhesive between the opposed substrate 82 and the incident side dust-proof glass 56.

As shown in FIG. 4, an antireflection layer 97 is disposed on each of a surface opposed to the opposed substrate 82 of the incident side dust-proof glass 56, a surface opposed to the incident side dust-proof glass 56 of the opposed substrate 82, a surface opposed to the element substrate 81 of the exit side dust-proof glass 62, and a surface opposed to the exit side dust-proof glass 62 of the element substrate 81.

As shown in FIG. 4, the exit side dust-proof glass support plate 63 has an opening part 63*h* for allowing the light to pass, and functions as a parting plate disposed on the exit side of the exit side dust-proof glass 62. As shown in FIG. 5, the exit side dust-proof glass support plate 63 is fixed to the panel support plate 86 of the frame 58 with an adhesive, and at the same time, fixed to the exit side dust-proof glass 62 with an adhesive. Thus, the exit side dust-proof glass support plate 63 supports the exit side dust-proof glass 62 in a state of having contact with the element substrate 81. In the case of the present embodiment, similarly to the incident side, there is disposed no adhesive between the element substrate 81 of the liquid crystal panel 54 and the exit side dust-proof glass 62. It should be noted that it is essential that no adhesive is disposed between the opposed substrate 82 and the incident side dust-proof glass 56, but it is possible for an adhesive to be disposed between the element substrate 81 and the exit side dust-proof glass 62.

Figure 6:
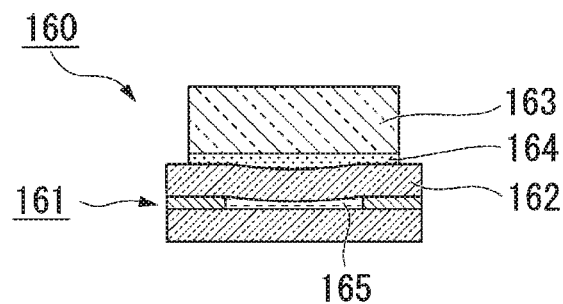
FIG. 6 is a schematic diagram of a related-art liquid crystal panel module.

FIG. 6 is a schematic diagram of a related-art liquid crystal panel module 160.

As shown in FIG. 6, in the related-art liquid crystal panel module 160, an incident side substrate 162 of a liquid crystal panel 161 and incident side dust-proof glass 163 are bonded to each other with an adhesive 164. In a projector provided with this liquid crystal panel module 160, there is a possibility that a color variation in the projection image occurs.

The inventors of the present disclosure have been dedicated to studying factors of occurrence of the color variation, and have realized the fact that the deterioration of an adhesive intervening between an incident side substrate and incident side dust-proof glass in a blue-light liquid crystal panel module is one of the factors of occurrence of the color variation as a result of the study. Specifically, in a liquid crystal panel module for modulating blue light shorter in wavelength compared to green light and red light, the adhesive is more easily deteriorated by the irradiation with the blue light. On this occasion, as described in FIG. 6, the adhesive 164 expands locally in a central portion of the liquid crystal panel 161, and as a result, in the liquid crystal panel 161, the thickness of a liquid crystal layer 165 becomes thinner in the central portion of the panel than in the peripheral edge portion of the panel. In contrast, in a liquid crystal panel module for modulating the green light or the red light, such a variation in thickness of the liquid crystal layer 165 does not occur. It is conceivable that the color variation in the projection image occurs as a result.

In contrast, in the blue-light liquid crystal panel module 400B in the present embodiment, since no adhesive is disposed between the opposed substrate 82 of the liquid crystal panel 54 and the incident side dust-proof glass 56, there is no possibility that there occurs the deformation of the liquid crystal panel 54 due to the localized volume expansion of the adhesive. Thus, according to the projector 1 provided with the blue-light liquid crystal panel module 400B in the present embodiment, it is possible to reduce the possibility of occurrence of the color variation in the projection image.

It should be noted that when the blue-light liquid crystal panel module 400B is provided with the exit side dust-proof glass 62 as in the present embodiment, it is conceivable to adopt a configuration of making an adhesive intervene between the element substrate 81 and the exit side dust-proof glass 62 similarly to the incident side. The inventors of the present disclosure have confirmed that the adhesive between the exit side substrate and the exit side dust-proof glass is small in volume expansion when irradiated with the light, and therefore, does not present such a serious problem as in the adhesive between the incident side substrate and the incident side dust-proof glass. It should be noted that in the blue-light liquid crystal panel module 400B in the present embodiment, there is disposed no adhesive between the element substrate 81 and the exit side dust-proof glass 62, it is possible to sufficiently reduce the possibility of the color variation in the projection image due to the volume expansion of the adhesive.

Figure 7:
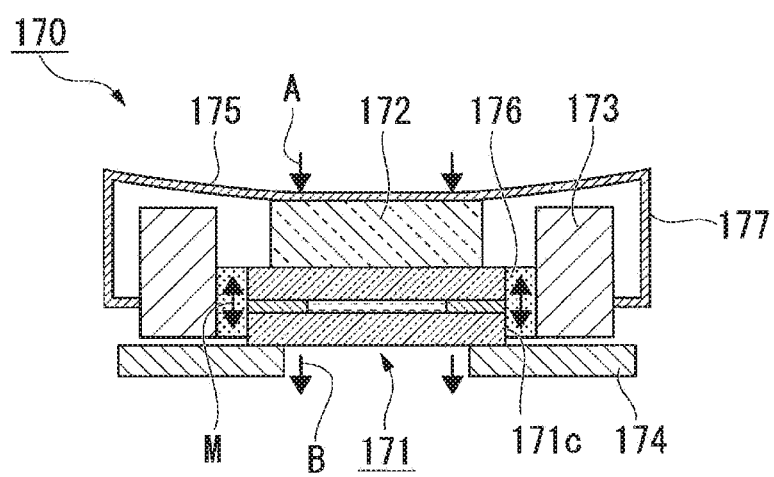
FIG. 7 is a schematic diagram of a liquid crystal panel module in a comparative example.

Here, there is considered a liquid panel module 170 in a comparative example shown in FIG. 7.

FIG. 7 is a schematic diagram of a liquid crystal panel module 170 in the comparative example.

As shown in FIG. 7, the liquid crystal panel module 170 in the comparative example is provided with a liquid crystal panel 171, incident side dust-proof glass 172, a frame body 173, a panel support plate 174, and a holding member 175. Similarly to the present embodiment, an adhesive 176 is disposed between a side surface 171c of the liquid crystal panel 171 and the frame body 173. Further, unlike the present embodiment, a locking part 177 of the holding member 175 is locked by the frame body 173.

The liquid crystal panel module 170 in the comparative example is substantially the same as the blue-light liquid crystal panel module 400B in the present embodiment in the point that the incident side dust-proof glass 172 is pressed against the liquid crystal panel 171 due to the plate spring action of the holding member 175. However, since in the liquid crystal panel module 170 in the comparative example, unlike the present embodiment, the locking part 177 of the holding member 175 is locked by the frame body 173, the incident side dust-proof glass 172 and the liquid crystal panel 171 are not clipped by the holding member 175.

Therefore, when the holding member 175 presses the incident side dust-proof glass 172 in a direction indicated by the arrow A, a shear stress M occurs in the adhesive 176, and the liquid crystal panel 171 is displaced in the same direction as the pressing direction of the holding member 175, namely a direction indicated by the arrow B, in some cases. In this case, since the liquid crystal panel 171 is displaced toward the exit side with respect to the optical system in the anterior stage of the liquid crystal panel 171, there occurs a focus shift, and there arises a possibility that the image quality degrades. Further, when the incident side dust-proof glass 172 cannot sufficiently suppress the liquid crystal panel 171 as a result of the displacement of the liquid crystal panel 171, a thermal resistance between the incident side dust-proof glass 172 and the liquid crystal panel 171 rises to thereby raise the temperature of the liquid crystal panel 171, and thus, there is a possibility that the image quality degrades.

Figure 8:
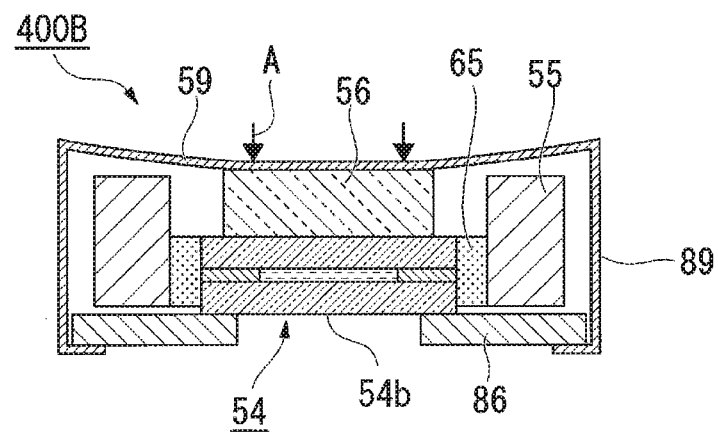
FIG. 8 is a diagram for explaining a function and an advantage of the liquid crystal panel module according to the embodiment.

FIG. 8 is a schematic diagram of the blue-light liquid crystal panel module 400B in the present embodiment.

In contrast, as shown in FIG. 8, in the blue-light liquid crystal panel module 400B in the present embodiment, the second locking parts 89 of the holding member 59 are locked by the panel support plate 86 having contact with the exit surface 54b of the liquid crystal panel 54. Therefore, the holding member 59 clips the incident side dust-proof glass 56 and the liquid crystal panel 54 via the panel support plate 86. Therefore, there is no chance that the shear stress occurs in the first fixation member 65 formed of the adhesive when the holding member 59 presses the incident side dust-proof glass 56 in the direction of the arrow A, and there is no chance for the liquid crystal panel 54 to be displaced toward the exit side. Thus, the degradation of the image quality due to defocus can be suppressed. Further, according to this configuration, since the incident side dust-proof glass 56 sufficiently presses the liquid crystal panel 54, the rise in thermal resistance between the incident side dust-proof glass 56 and the liquid crystal panel 54 is suppressed, and it is possible to suppress the degradation of the image quality due to the rise in temperature of the liquid crystal panel 54.

Further, in the case of the present embodiment, since the exit side polarization plate 64 is held by the polarization plate support frame 87 of the frame 58, it is possible to simplify the holding structure of the exit side polarization plate 64 without separately providing a member for holding the exit side polarization plate 64.

In the case of the present embodiment, since no adhesive is disposed between the opposed substrate 82 and the incident side dust-proof glass 56, when particularly viewing the place where the opposed substrate 82 and the incident side dust-proof glass 56 have contact with each other, a microscopic air layer exists between the opposed substrate 82 and the incident side dust-proof glass 56 in some cases. In this case, there is a possibility that reflection of the light occurs on the interface between the constituent material of the opposed substrate 82 and the incident side dust-proof glass 56 and the air due to a difference in refractive index between the constituent material of the opposed substrate 82 and the incident side dust-proof glass 56 and the air.

With respect to this problem, in the present embodiment, since the antireflection layer 97 is disposed on the surface opposed to the opposed substrate 82 of the incident side dust-proof glass 56, and the surface opposed to the incident side dust-proof glass 56 of the opposed substrate 82, it is possible to suppress the reflection of the light on the interface between the opposed substrate 82 and the air, and the interface between the incident side dust-proof glass 56 and the air. Similarly, since the antireflection layer 97 is disposed on the surface opposed to the element substrate 81 of the exit side dust-proof glass 62, and the surface opposed to the exit side dust-proof glass 62 of the element substrate 81, it is possible to suppress the reflection of the light on the interface between the element substrate 81 and the air, and the interface between the exit side dust-proof glass 62 and the air. In the case of the present embodiment, since the antireflection layer 97 is provided in particular to the blue-light liquid crystal panel module 400B, it is possible to optimize the characteristic of the antireflection layer 97 with respect to the wavelength band of the blue light.

Further, in the case of the present embodiment, since the first fixation member 65 made of the adhesive is disposed between the frame body 55 and the side surface 82c of the opposed substrate 82, and between the frame body 55 and the side surface 81c of the element substrate 81, the surface on which the incident side dust-proof glass 56 and the opposed substrate 82 have contact with each other is shielded by the first fixation member 65 against the ambient air. Therefore, it is possible to surely protect the surface on which the incident side dust-proof glass 56 and the opposed substrate 82 have contact with each other from dust.

Further, since the second fixation member 66 made of the adhesive is disposed between the circumferential edge portion of the incident side dust-proof glass 56 and the incident side member 57, and between the frame body 55 and the incident side member 57, the entry pathways of the dust passing through a gap between the incident side dust-proof glass 56 and the incident side member 57, and a gap between the frame body 55 and the incident side member 57 is blocked by the second fixation member 66 from the ambient air. Thus, it is possible to more surely protect the surface on which the incident side dust-proof glass 56 and the opposed substrate 82 have contact with each other from dust.

Modified Example

In the embodiment described above, the exit side dust-proof glass 62 is fixed to the exit side dust-proof glass support plate 63 with the adhesive, but, instead of this configuration, it is possible to hold the exit side dust-proof glass 62 with a holding member similarly to the case of the incident side dust-proof glass 56.

Figure 9:
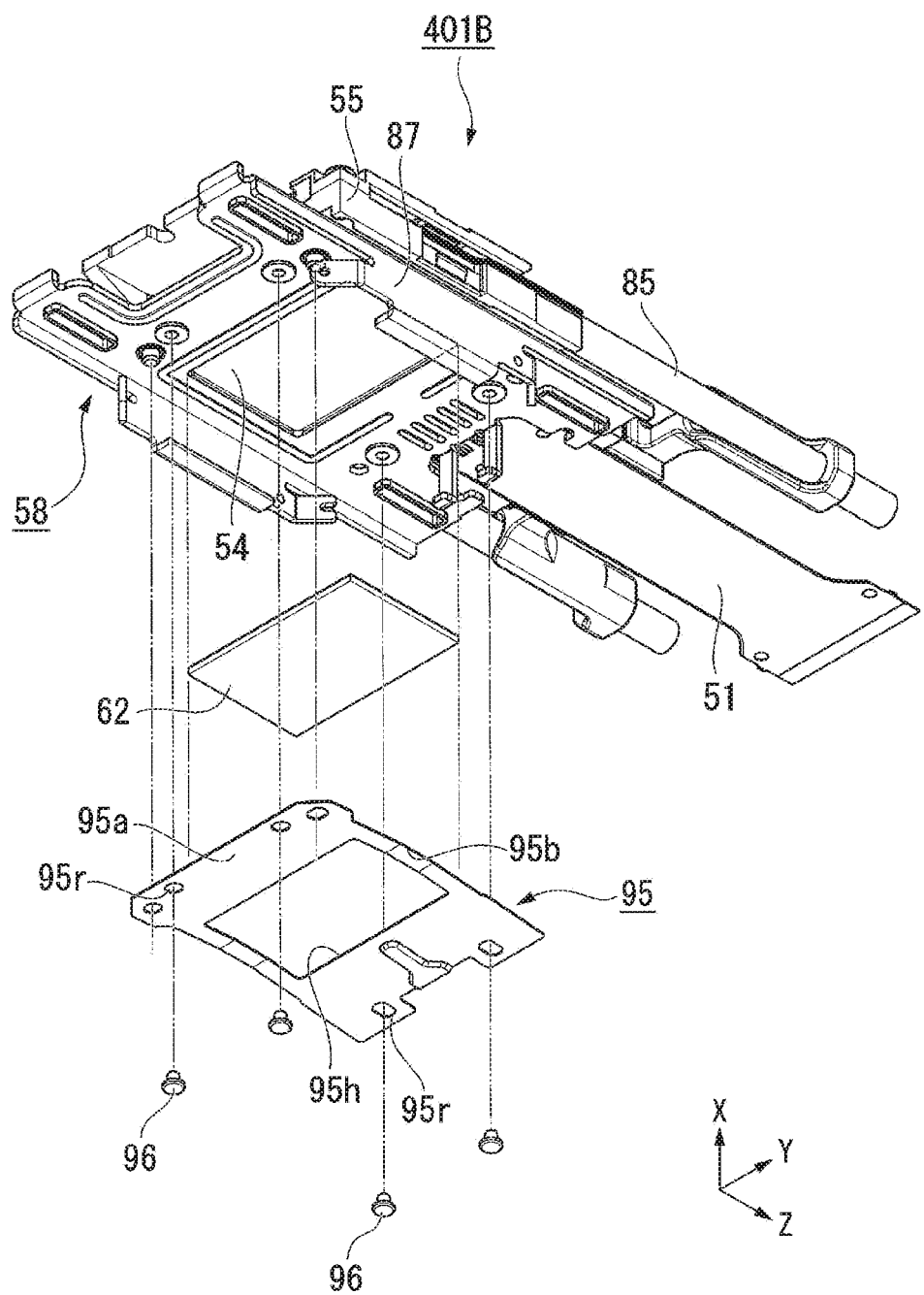
FIG. 9 is an exploded perspective view of a liquid crystal panel module in a modified example.

FIG. 9 is an exploded perspective view of a blue-light liquid crystal panel module 401B in the modified example.

In FIG. 9, the constituents common to the drawing used in the embodiments described above are denoted by the same reference symbols, and the description thereof will be omitted.

As shown in FIG. 9, in the blue-light liquid crystal panel module 401B in the modified example, an exit side dust-proof glass support plate 95 has an opening part 95h for allowing the light to pass, and has a rectangular ring-like shape viewed from a direction parallel to the X axis. In the exit side dust-proof glass support plate 95, short-side parts 95b each warp so that a central portion is convexed toward the incident side with respect to both end portions coupled to long-side parts 95a. Thus, the exit side dust-proof glass support plate 95 has contact with the exit side dust-proof glass 62 in at least the central portions of the short-side parts 95b.

The exit side dust-proof glass support plate 95 is made elastically deformable. It should be noted that the exit side dust-proof glass support plate 95 is not necessarily required to be elastically deformable in its entirety, but is only required to be elastically deformable in at least the short-side parts 95b. Thus, the short-side parts 95b exert a plate spring action.

The exit side dust-proof glass support plate 95 has a plurality of holes 95r in the circumferential edge portion. The exit side dust-proof glass support plate 95 is fixed to the frame 58 with screws 96 inserted through these holes. It should be noted that as a measure for fixing the exit side dust-proof glass support plate 95 to the frame 58, there can be used, for example, pins or swaging besides the screws 96.

According to the configuration of the present modified example, the exit side dust-proof glass 62 is fixed by being pressed against the liquid crystal panel 54 due to the spring action of the exit side dust-proof glass support plate 95. Therefore, it is possible to make the exit side dust-proof glass 62 adhere to the liquid crystal panel 54 without disposing an adhesive between the exit side dust-proof glass 62 and the liquid crystal panel 54.

Second Embodiment

Hereinafter, a second embodiment of the present disclosure will be described using FIG. 10 and FIG. 11.

A projector according to the second embodiment is substantially the same in configuration as that of the first embodiment, but is different in the configuration of the blue-light liquid crystal panel module from that of the first embodiment. Therefore, the description of the whole of the projector will be omitted.

Figure 10:
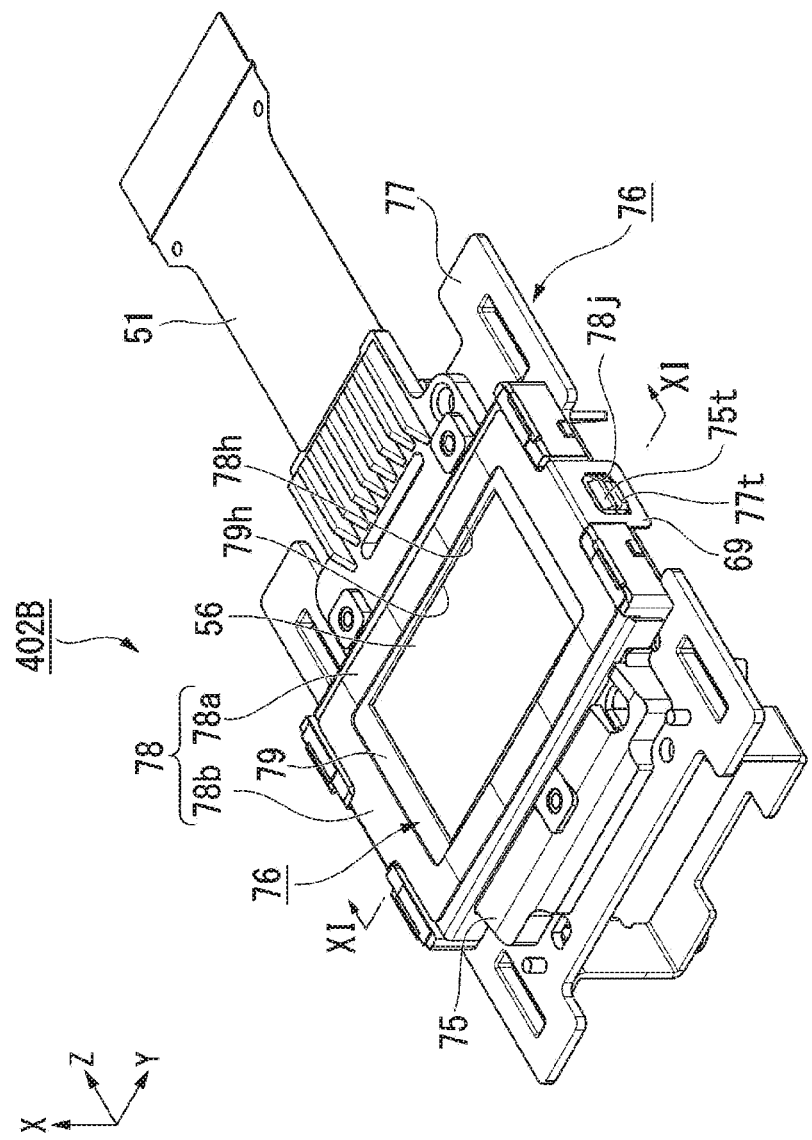
FIG. 10 is a perspective view of a blue-light liquid crystal panel module in a second embodiment.

FIG. 10 is a perspective view of a blue-light liquid crystal panel module 402B in the second embodiment. FIG. 11 is a cross-sectional view of the blue-light liquid crystal panel module 402B along the line XI-XI in FIG. 10.

Figure 11:
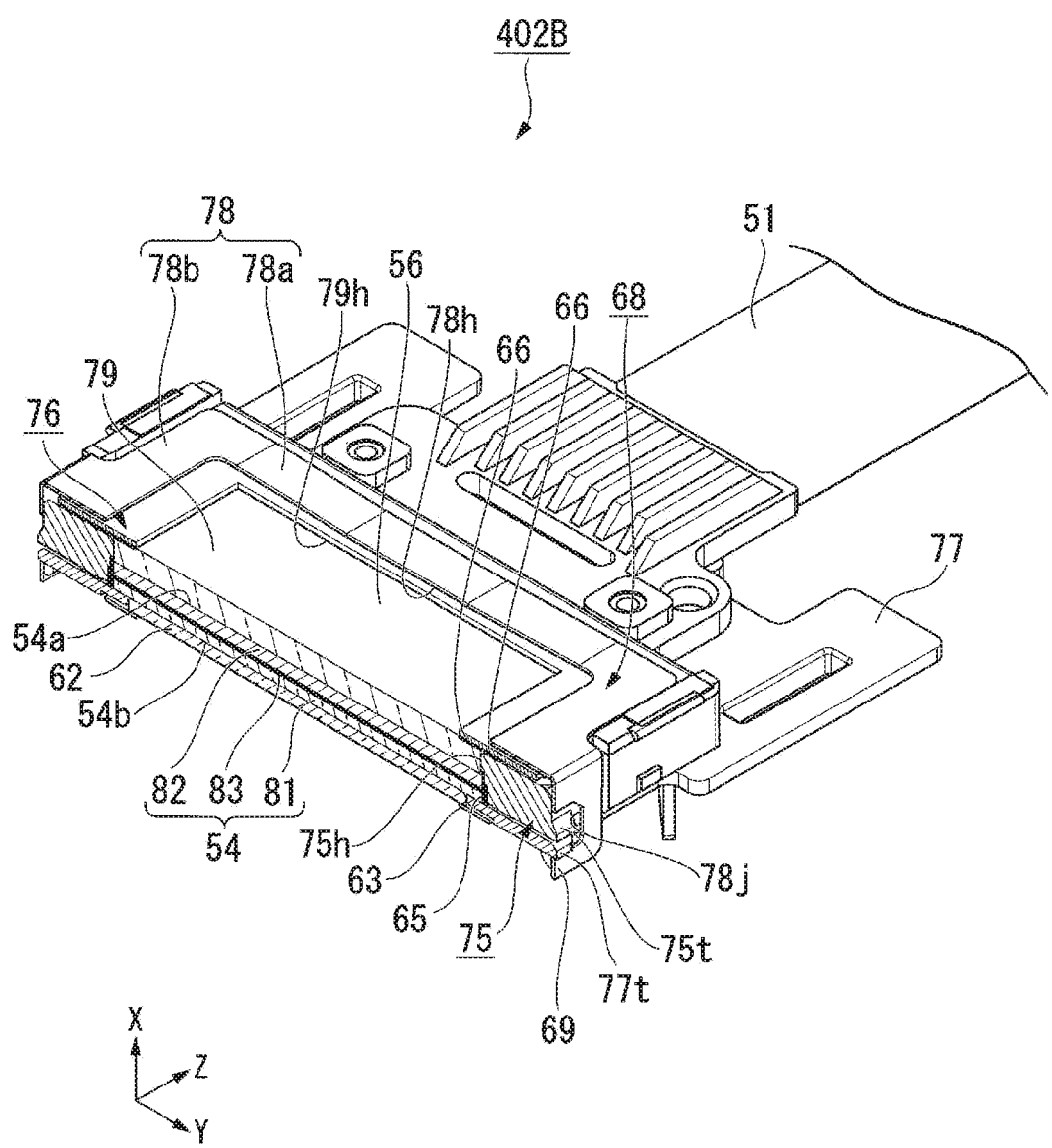
FIG. 11 is a cross-sectional view of the blue-light liquid crystal panel module along the line XI-XI in FIG. 10.

In FIG. 10 and FIG. 11, the constituents common to the drawings used in the first embodiment are denoted by the same reference symbols, and the description thereof will be omitted.

As shown in FIG. 10 and FIG. 11, the blue-light liquid crystal panel module 402B in the present embodiment is provided with the liquid crystal panel 54 (the first light modulation panel), a frame body 75, the incident side dust-proof glass 56 (the second incident side substrate), an incident side member 76, a panel support plate 77 (the support target member), a holding member 68, an incident side polarization plate (not shown), an incident side polarization plane support member (not shown), the exit side dust-proof glass 62 (the second exit side substrate), the exit side dust-proof glass support plate 63, an exit side polarization plate (not shown), the first fixation member 65, and the second fixation member 66. It should be noted that the frame body 75 has a first opening part 75h.

The incident side member 76 in the present embodiment is formed of a support frame 79 for supporting the incident side dust-proof glass 56, and does not have the liquid flow pipes in the first embodiment. In other words, while the blue-light liquid crystal panel module 400B in the first embodiment has the liquid cooling type liquid crystal panel cooling mechanism, the blue-light liquid crystal panel module 402B in the present embodiment has an air-cooling type liquid crystal panel cooling mechanism. The support frame 79 has a rectangular ring-like shape viewed from a direction parallel to the X axis, and has an opening part 79h which allows the light to enter.

The panel support plate 77 has locking protruding parts 77t (first locking parts). The panel support plate 77 and the locking protruding parts 77t are formed as an integrated member. The panel support plate 77 supports the liquid crystal panel 54 from the exit side in a state of having contact with the exit surface 54b of the liquid crystal panel 54, namely the exit surface of the element substrate 81. In the outer edge portion of the panel support plate 77, at positions corresponding to the second opening parts 78j of the holding member 68, there are disposed the locking protruding parts 77t. The locking protruding parts 77t protrude toward the outside in the Y-axis direction from the panel support plate 77, and are respectively inserted in the second opening parts 78j together with the insertion protruding parts 75t of the frame body 75, and each have contact with the lower side of the second opening part 78j.

The holding member 68 has a pressing part 78, and second clocking parts 69 disposed in a circumferential edge portion of the pressing part 78. The pressing part 78 has a rectangular ring-like shape viewed from a direction parallel to the X axis, and has a third opening part 78h for allowing the light emitted from the light source device 5 to pass. In the pressing part 78, long-side parts 78a each warp so that a central portion is convexed toward the exit side with respect to both end portions coupled to short-side parts 78b. As shown in FIG. 11, the pressing part 78 has contact with the support frame 79 in the central portion of the long-side part 78a, and does not have contact with the support frame 79 in the both end portions of the long-side part 78a and the short-side parts 78b. The holding member 68 is made elastically deformable.

The second locking parts 69 extend from the short-side parts 78b of the pressing part 78 toward the exit side. The second locking parts 69 each have the second opening part 78j in which the insertion protruding part 75t of the frame body 75 and the locking protruding part 77t of the panel support plate 77 are inserted. Similarly to the first embodiment, in the state in which the locking protruding parts 77t and the second opening parts 78j are locked each other, the holding member 68 presses the support frame 79 against the incident side dust-proof glass 56 due to the plate spring action. Thus, the holding member 68 presses and holds the incident side member 76, the incident side dust-proof glass 56, the liquid crystal panel 54, and the panel support plate 77 in a clipped state.

The opposed substrate 82 of the liquid crystal panel 54 and the incident side dust-proof glass 56 are pressed by the holding member 68 to thereby adhere to each other, and no adhesive is disposed between the opposed substrate 82 and the incident side dust-proof glass 56. The rest of the configuration of the blue-light liquid crystal panel module 402B is substantially the same as in the first embodiment.

Also in the present embodiment, there are obtained substantially the same advantages as in the first embodiment such as the advantage that the deformation of the liquid crystal panel 54 due to the localized volume expansion of the adhesive is suppressed to thereby reduce the possibility of the color variation in the projection image, the advantage that the degradation of the image quality due to the rise in temperature of the liquid crystal panel 54, the advantage that the holding structure of the exit side polarization plate can be simplified, the advantage that the reflection of the light on the interface between the liquid crystal panel 54 and the incident side dust-proof glass 56 can be suppressed, and the advantage that the gap between the incident side dust-proof glass 56 and the liquid crystal panel 54 is sealed, and thus the surface on which the incident side dust-proof glass 56 and the liquid crystal panel 54 have contact with each other can surely be protected from dust.

It should be noted that the scope of the present disclosure is not limited to the embodiments described above, but a variety of modifications can be provided thereto within the scope or the spirit of the present disclosure.

For example, it is possible for the liquid crystal panel module to have a configuration provided with a compensation element for compensating the phase difference in light or a wave plate in addition to the incident side polarization plate and the exit side polarization plate.

Further, although the projector according to the embodiments described above is a projector provided with three light modulation devices corresponding respectively to the red light, the green light, and the blue light, namely a so-called three-panel projector, the present disclosure can also be applied to a projector provided with two, or four or more light modulation devices. Further, although in the embodiments described above, there is cited the example of the liquid crystal panel module provided with the transmissive liquid crystal panels, there can also be adopted a liquid crystal panel module provided with reflective liquid crystal panels. Further, although in the embodiments described above, there is cited the example of the projector provided with the light source device having the laser source and the wavelength conversion device, the present disclosure can also be applied to a projector provided with a light source device having a different light emitting element such as a discharge lamp.

Besides the above, the specific descriptions of the shape, the number, the arrangement, the material, and so on of each of the constituents of the light source device, the liquid crystal panel module, and the projector are not limited to those in the embodiments described above, but can arbitrarily be modified.

What is claimed is:

1. A projector comprising:
a light source device;
a plurality of liquid crystal panel modules configured to modulate light emitted from the light source device;
a combining prism configured to combine light emitted from the plurality of liquid crystal panel modules;
a fixed panel module support configured to support the plurality of liquid crystal panel modules to the combining prism; and
a plurality of projection lenses configured to project light emitted from the combining prism, wherein
a first liquid crystal panel module out of the plurality of liquid crystal panel modules includes
a first liquid crystal panel having a first incident side substrate, a first exit side substrate, and a liquid crystal layer disposed between the first incident side substrate and the first exit side substrate,
a frame body which defines a first opening, and is disposed so as to surround at least a side surface of the first incident side substrate and a side surface of the first exit side substrate,
a second incident side substrate disposed in the first opening so as to be opposed to the first incident side substrate,
an incident side support frame fixed to the second incident side substrate and the frame body,
a frame which is supported by the fixed panel module support and has a panel support plate supporting the first liquid crystal panel and a first locking part protruding from an outer edge portion of the panel support plate, and
a holder which is made elastically deformable, has a second locking part locking to the first locking part and a pressing part pressing to the incident side support frame,
wherein the second locking part has a second opening which is disposed in a circumferential edge portion of the pressing part and in which the first locking part is inserted,
the panel support plate supports the first liquid crystal panel from an exit side in a state of having contact with a circumferential edge portion of the exit surface of the first liquid crystal panel,
the holder presses and holds the incident side support frame, the second incident side substrate, the first incident side substrate, the first exit side substrate and the panel support plate due to an elastic deformation of the holder when the second locking part locks to the first locking part,
and
the second incident side substrate thereof directly opposes the first incident side substrate thereof with no adhesive layer between the first and second incident side substrates.

2. The projector according to claim 1, wherein
the first liquid crystal panel module further includes a second exit side substrate disposed so as to be opposed to the first exit side substrate and a second exit side substrate support plate fixed to the panel support plate and disposed on the second exit side substrate.

3. The projector according to claim 1, wherein
the first liquid crystal panel module modulates blue light.

4. The projector according to claim 1, wherein
the first liquid crystal panel module further includes an exit side polarization plate disposed so as to be opposed to the first exit side substrate, and
the frame has a polarization plate support frame holding the exit side polarization plate.

5. The projector according to claim 1, wherein
the first liquid crystal panel module further includes an antireflection layer disposed on a surface opposed to the first incident side substrate of the second incident side substrate, and a surface opposed to the second incident side substrate of the first incident side substrate.

6. The projector according to claim 1, wherein
the first liquid crystal panel module further includes a first adhesive disposed between the frame body and a side surface of the first incident side substrate, and between the frame body and a side surface of the first exit side substrate.

7. The projector according to claim 1, wherein
the first liquid crystal panel module further includes a second adhesive disposed between a circumferential edge portion of the second incident side substrate and the incident side support frame, and between the frame body and the incident side support frame.

8. A liquid crystal panel module comprising:
a liquid crystal panel having a first incident side substrate, a first exit side substrate, and a liquid crystal layer disposed between the first incident side substrate and the first exit side substrate,
a frame body which defines a first opening, and is disposed so as to surround at least a side surface of the first incident side substrate and a side surface of the first exit side substrate,
a second incident side substrate disposed in the first opening so as to be opposed to the first incident side substrate,
an incident side support frame fixed to the second incident side substrate and the frame body,
a frame having a panel support plate supporting the liquid crystal panel and a first locking part protruding from an outer edge portion of the panel support plate, and
a holder which is made elastically deformable, has a second locking part locking to the first locking part and a pressing part pressing to the incident side support frame,
wherein the second locking part has a second opening which is disposed in a circumferential edge portion of the pressing part and in which the first locking part is inserted,
the panel support plate supports the liquid crystal panel from an exit side in a state of having contact with a circumferential edge portion of the exit surface of the liquid crystal panel,
the holder presses and holds the incident side support frame, the second incident side substrate, the first incident side substrate, the first exit side substrate, and the panel support plate due to an elastic deformation of the holder when the second locking part locks to the first locking part,
and
the second incident side substrate thereof directly opposes the first incident side substrate thereof with no adhesive layer between the first and second incident side substrates.

9. The liquid crystal panel module according to claim 8, further including a first adhesive disposed between the frame body and a side surface of the first incident side substrate, and between the frame body and a side surface of the first exit side substrate.

10. The liquid crystal panel module according to claim 8, further including a second adhesive disposed between a circumferential edge portion of the second incident side substrate and the incident side support frame, and between the frame body and the incident side support frame.

11. A projector comprising:
a light source device;
a plurality of liquid crystal panel modules configured to modulate light emitted from the light source device;
a combining prism configured to combine light emitted from the plurality of liquid crystal panel modules;
a fixed panel module support configured to support the plurality of liquid crystal panel modules to the combining prism; and
a plurality of projection lenses configured to project light emitted from the combining prism, wherein
a first liquid crystal panel module out of the plurality of liquid crystal panel modules includes
a first liquid crystal panel having a first incident side substrate, a first exit side substrate, and a liquid crystal layer disposed between the first incident side substrate and the first exit side substrate,
a frame body which defines a first opening, and is disposed so as to surround at least a side surface of the first incident side substrate and a side surface of the first exit side substrate,
a second incident side substrate disposed in the first opening so as to be opposed to the first incident side substrate,
an incident side support frame fixed to the second incident side substrate and the frame body,
a frame which is supported by the fixed panel module support, and has a panel support plate supporting the first liquid crystal panel and a first locking part protruding from an outer edge portion of the panel support plate, and
a holder which is made elastically deformable, has a second locking part locking to the first locking part which is disposed in a circumferential edge portion of a pressing part and the pressing part pressing to the incident side support frame,
wherein the first liquid crystal panel module modulates blue light,
the panel support plate supports the first liquid crystal panel from an exit side in a state of having contact with a circumferential edge portion of the exit surface of the first liquid crystal panel,
the holder presses and holds the incident side support frame, the second incident side substrate, the first incident side substrate, the first exit side substrate; and the panel support plate due to an elastic deformation of the holder when the second locking part locks to the first locking part, and
the second incident side substrate thereof directly opposes the first incident side substrate thereof with no adhesive layer between the first and second incident side substrates.

\* \* \* \* \*